Figure 1:
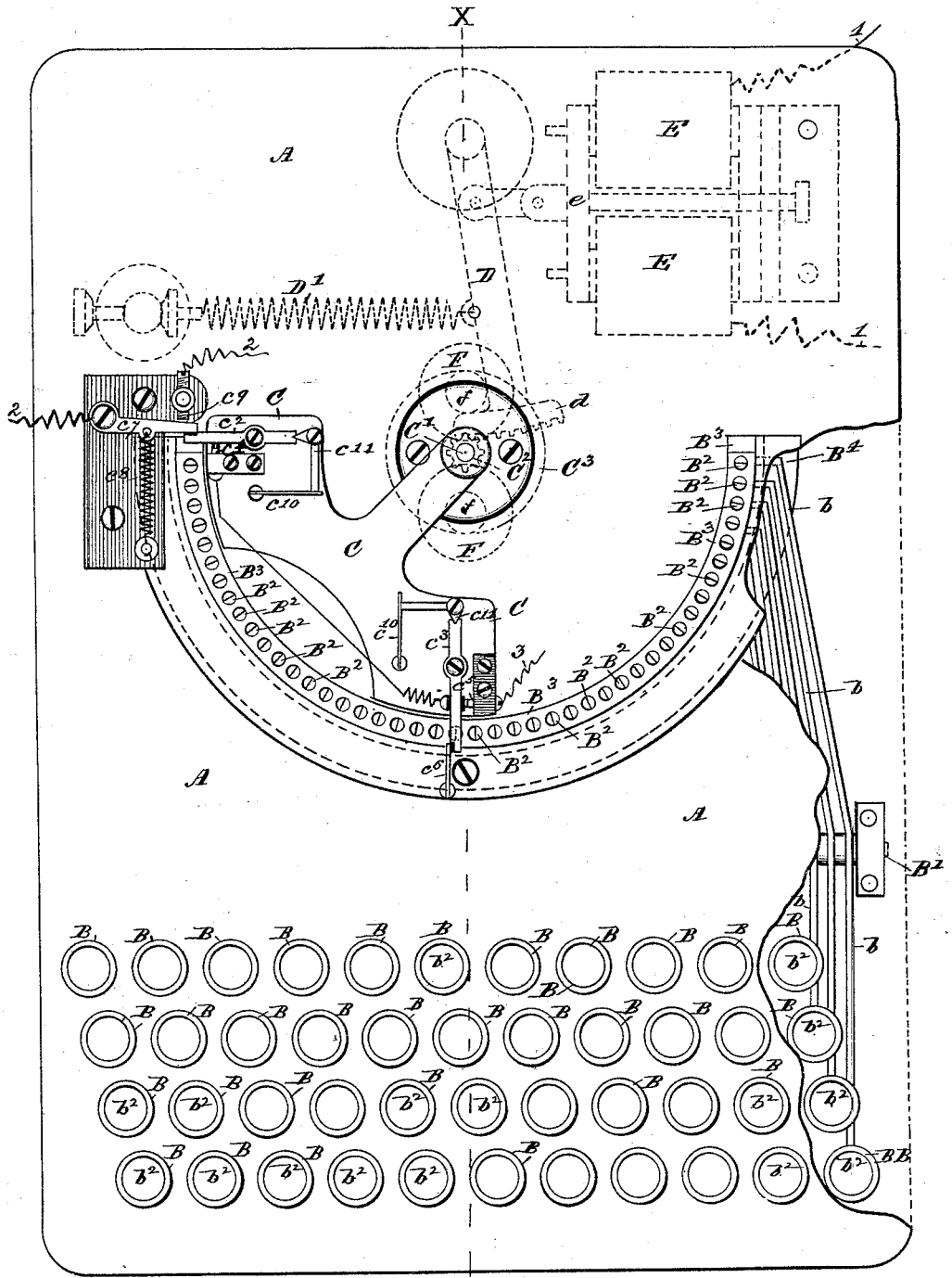

(No Model.) 8 Sheets—Sheet 1.

J. B. ODELL.
PRINTING TELEGRAPH.

No. 434,881. Patented Aug. 19, 1890.

Witnesses:
S. B. Dover.
C. W. Davenport

Inventor.
John B. Odell.
by Geo. W. Levin,
Attorney.

(No Model.) 8 Sheets—Sheet 2.

J. B. ODELL.
PRINTING TELEGRAPH.

No. 434,881. Patented Aug. 19, 1890.

Witnesses:
S. B. Dover.
O. W. Davenport

Inventor:
John B. Odell
by Geo. W. LeVin
Attorney.

(No Model.) 8 Sheets—Sheet 3.
J. B. ODELL.
PRINTING TELEGRAPH.

No. 434,881. Patented Aug. 19, 1890.

Witnesses:
S. B. Dover.
C. W. Davenport

Inventor.
John B. Odell.
by Geo. W. LeVin.
Attorney.

(No Model.) 8 Sheets—Sheet 5.

J. B. ODELL.
PRINTING TELEGRAPH.

No. 434,881. Patented Aug. 19, 1890.

Witnesses:
Sam'l B. Dover.
C. W. Davenport

Inventor.
John B. Odell.
by Geo. W. Levin.
Attorney.

THE NORRIS PETERS CO., PHOTO-LITHO., WASHINGTON, D. C.

(No Model.) 8 Sheets—Sheet 6.
J. B. ODELL.
PRINTING TELEGRAPH.
No. 434,881. Patented Aug. 19, 1890.
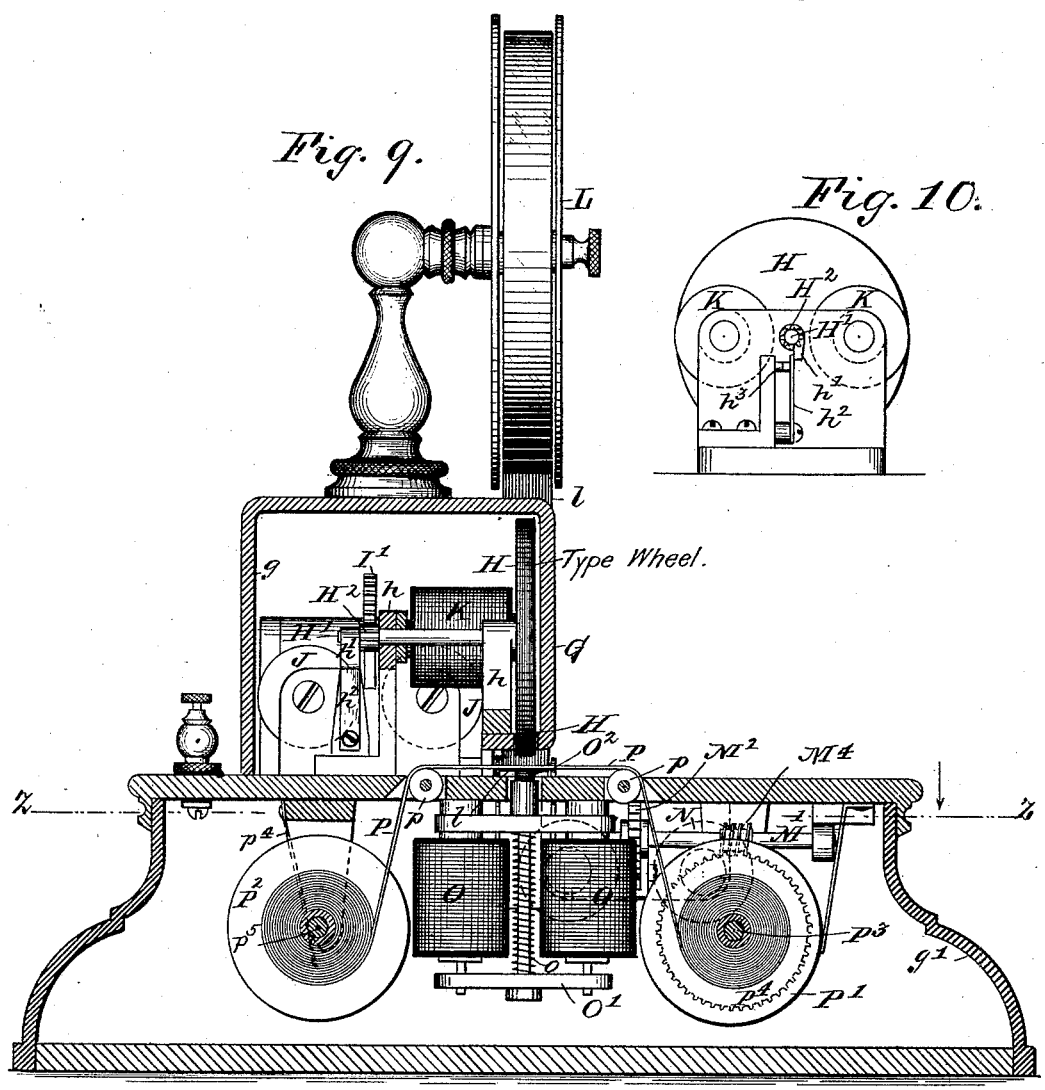
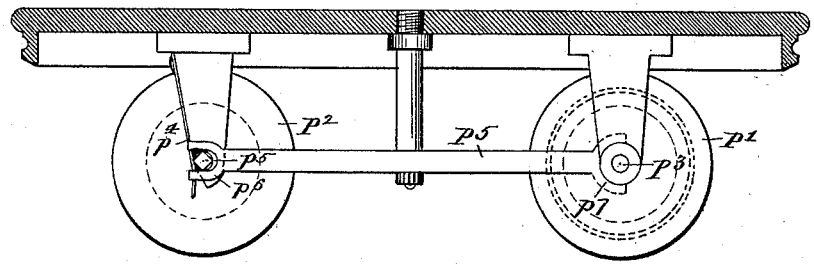
Witnesses:
Sam¹ B. Dover.
C. W. Davenport
Inventor:
John B. Odell.
by Geo. W. LeVin.
Attorney.

(No Model.)  8 Sheets—Sheet 7.

J. B. ODELL.
PRINTING TELEGRAPH.

No. 434,881.  Patented Aug. 19, 1890.

Witnesses:
Sam'l B. Dover.
G. W. Davenport

Inventor:
John B. Odell.
by Geo. W. LeVin.
Attorney.

(No Model.)

8 Sheets—Sheet 8.

J. B. ODELL.
PRINTING TELEGRAPH.

No. 434,881. Patented Aug. 19, 1890.

Witnesses:
S. B. Dover
C. W. Davenport

Inventor:
John B. Odell.
by Geo. W. LeVin.
Attorney.

UNITED STATES PATENT OFFICE.

JOHN B. ODELL, OF CHICAGO, ILLINOIS, ASSIGNOR TO THE PRINTING TELEGRAPH COMPANY OF ILLINOIS, OF SAME PLACE.

PRINTING-TELEGRAPH.

SPECIFICATION forming part of Letters Patent No. 434,881, dated August 19, 1890.

Application filed February 8, 1889. Serial No. 299,174. (No model.)

*To all whom it may concern:*

Be it known that I, JOHN B. ODELL, a citizen of the United States, residing at Chicago, in the county of Cook and State of Illinois, have invented certain new and useful Improvements in Printing-Telegraphs, of which the following is a full, clear, and exact description, reference being had to the accompanying drawings, and to the letters and figures of reference marked thereon, which form part of this specification.

My present invention relates, generally, to printing-telegraph systems of the class in which transmitting and receiving instruments of any desired number are employed in circuit for sending and recording matter and messages, but more particularly to improvements in the special organization and operative arrangement, severally and conjointly, of the apparatus and circuits essential to a printing-telegraph system wherein the matter transmitted is caused to be printed by the receiving-instrument upon continuous strips of suitable material.

The general object of the invention is to provide a printing-telegraph system which at once affords great rapidity and accuracy in the transmission and recording of matter desired to be intercommunicated.

To this end the invention consists in the improvements hereinafter described, and pointed out in the appended claims.

The important general features embraced in the invention may be set forth as follows: First, the novel organization and operative arrangement of the sending-instrument, whereby the same is adapted through the operation of finger-keys, forming part thereof, to open and close the main-line circuit with which it is in operative connection for differential periods of time, and thereby effect through the receiving-instrument the recording of letters, characters, &c., needed in printing-telegraphy; second, the novel organization and operative arrangement of the receiving-instrument, whereby the instrument is adapted to record respective letters, characters, &c., responsively to and corresponding with respective differential periods of time for which the electrical condition of the main-line circuit is changed by the sending-instrument.

A more specific description of the features of construction and operative arrangement of the several instruments and their accessories is as follows: The transmitter is provided with a system of finger-keys representing the various letters, characters, &c., necessary in printing-telegraphy, which are operatively in electrical connection with a local relay which controls the main-line circuit and a local relay which controls the electro-mechanical devices which essentially form part of the instrument. The radius-arm, retracted to and held inactive at a zero or starting position by electro-magnets in a normally-closed local circuit and actuated as to its forward movement by a spring, weight, or other suitable source of power, is caused to start in motion through the operation of either one of the finger-keys of the system, the operation of such key closing, through suitable contact-connections with which it is caused to engage, a circuit through said relays and said radius-arm, which circuit operates through said relays to change the electrical condition of the main line and to open the circuit of the magnets which held said radius-arm inactive, freeing said arm and permitting it to be carried forward by the said spring, weight, &c. The operation of each finger-key to close the said circuit simultaneously carries a mechanical intercepting-point within the path of travel of the radius-arm, the said point being operative to engage with a circuit-changer carried by the radius-arm through which the circuit of said arm and said relay or relays is completed, to break said circuit when said arm and the mechanical intercepting-point come into engagement, and thereby operate the relay which controls the main-line circuit so as to restore said main-line circuit to its primary electrical condition. Further manipulation of the said key—to wit, its removal from the said contact-connections with which it was caused to engage—operates the relay which controls the magnets which retract to and hold the radius-arm at its starting or zero position. As the radius-arm is retracted to its starting position it is caused to close a circuit which energizes electro-magnets which instantly arrest and rigorously hold it against vibratory or other movement. The said mechanical intercepting-points being operatively arranged progressively within the path of travel of the radius-arm, which essentially starts at each operation from a common point, the position which each point occupies distant respectively from said starting-point determines the distance which said arm shall travel through each of its forward movements, and therefore the period of time for which the main-line circuit shall remain changed from its normal electrical condition.

The receiving-instrument, which is electrically connected with and operated by local relays controlled by a main-line relay, embraces an axially-movable printing-wheel provided with letters, characters, figures, and spacing-blanks corresponding with the progressive arrangement of the mechanical intercepting-points of the transmitter, which is held inactive at and retracted after each printing function to a common starting or zero point by electro-magnets in a normally-closed circuit, which is opened by said local relays as the normal electrical condition of the main line is changed by the transmitter; a spring, weight, or other source of power, which controls the forward movement of said wheel when released by said magnets; magnets in a circuit controlled by said local relays, operative to arrest in its forward movement and hold the printing-wheel in its printing position as the main line is restored to its primary electrical condition and to rigorously secure said wheel against vibratory movement when retracted to its starting position; magnets in a circuit also controlled by said local relays, operative, when the printing-wheel is arrested through its forward movement, to carry a strip upon which the letters, character, &c., are to be recorded against the printing-surface of said wheel, and to open a circuit which, causing the said local relays to act, opens the circuit of the printing-wheel-arresting magnets and closes the circuit of the printing-wheel-retracting magnets, enabling the said wheel to be returned to its starting position; and electro-mechanical devices for successively affecting longitudinal feed of the strip upon which the matter is recorded by the printing-wheel.

Other details of construction and operative arrangement are embraced in the invention, as will hereinafter fully appear.

Figure 2:
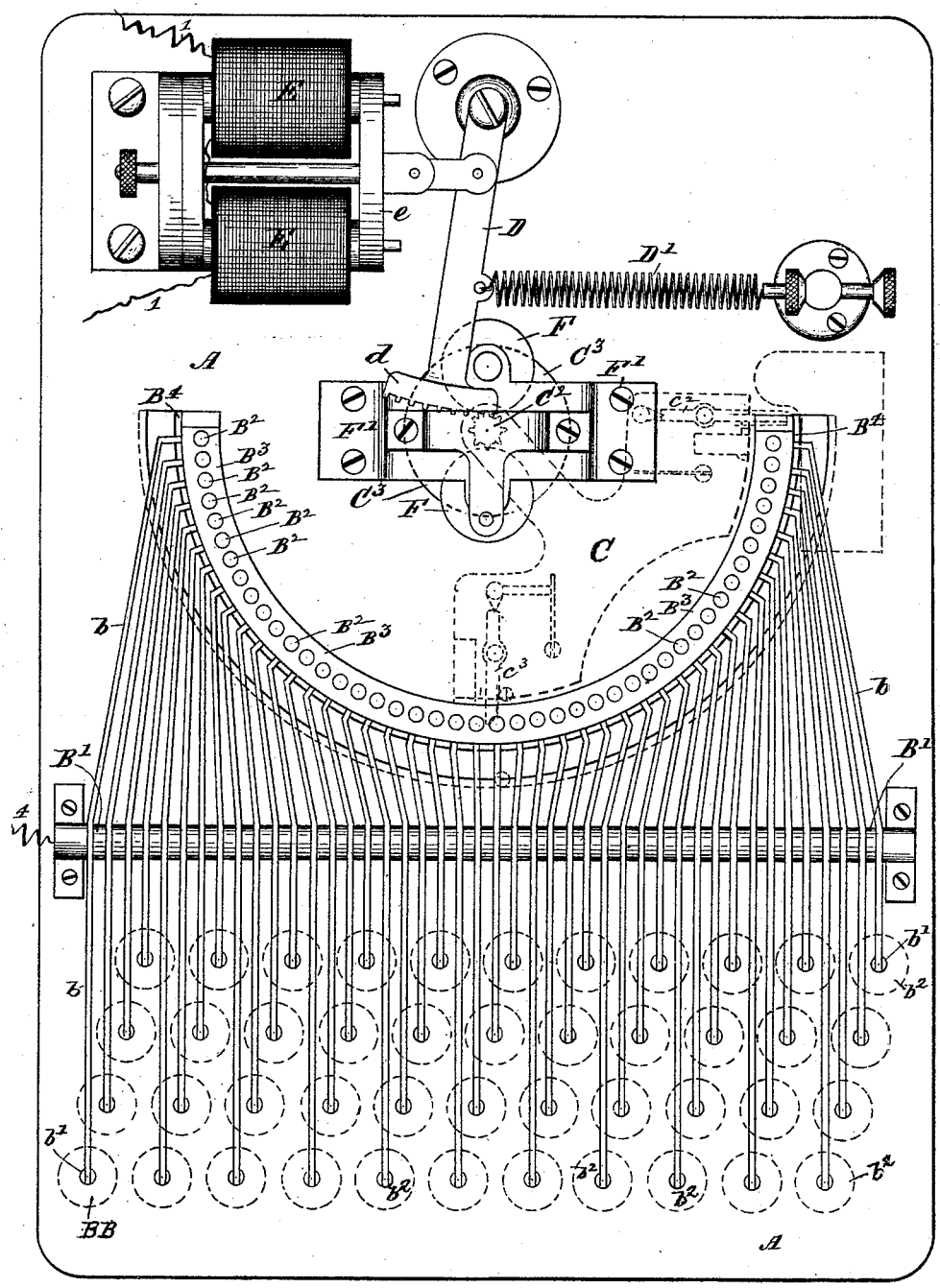
Figure 3:
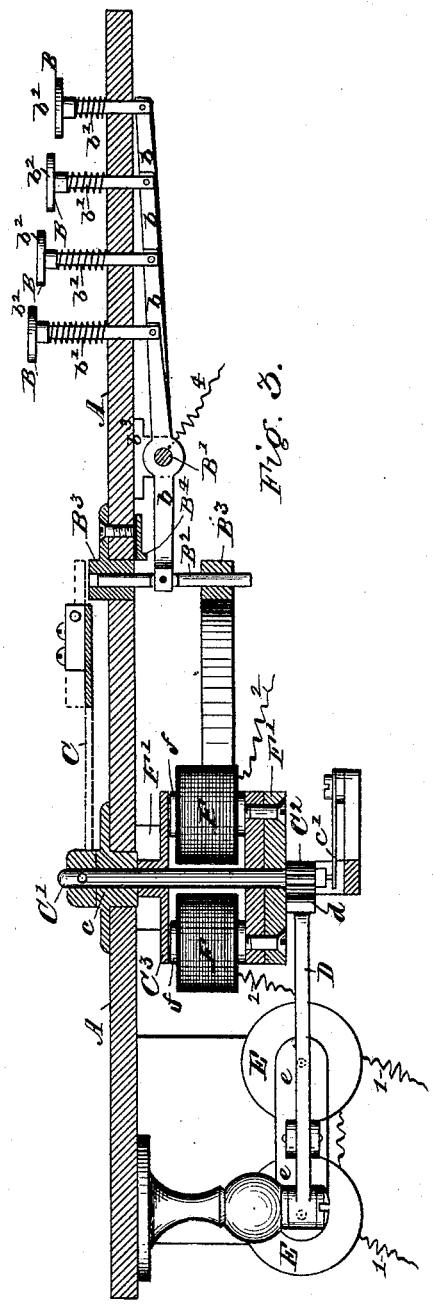
Figure 4:
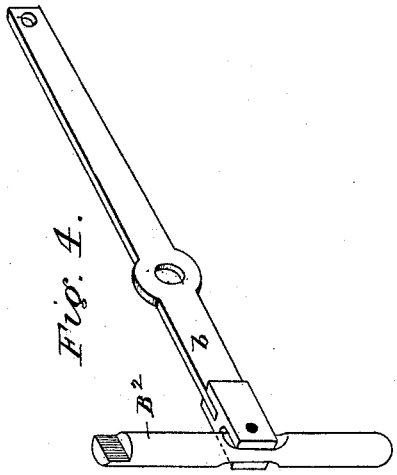
Figure 5:
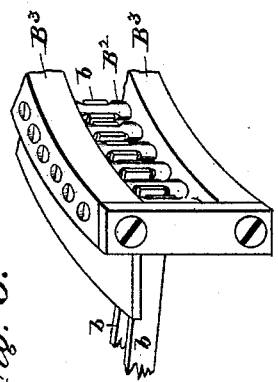
Figure 6:
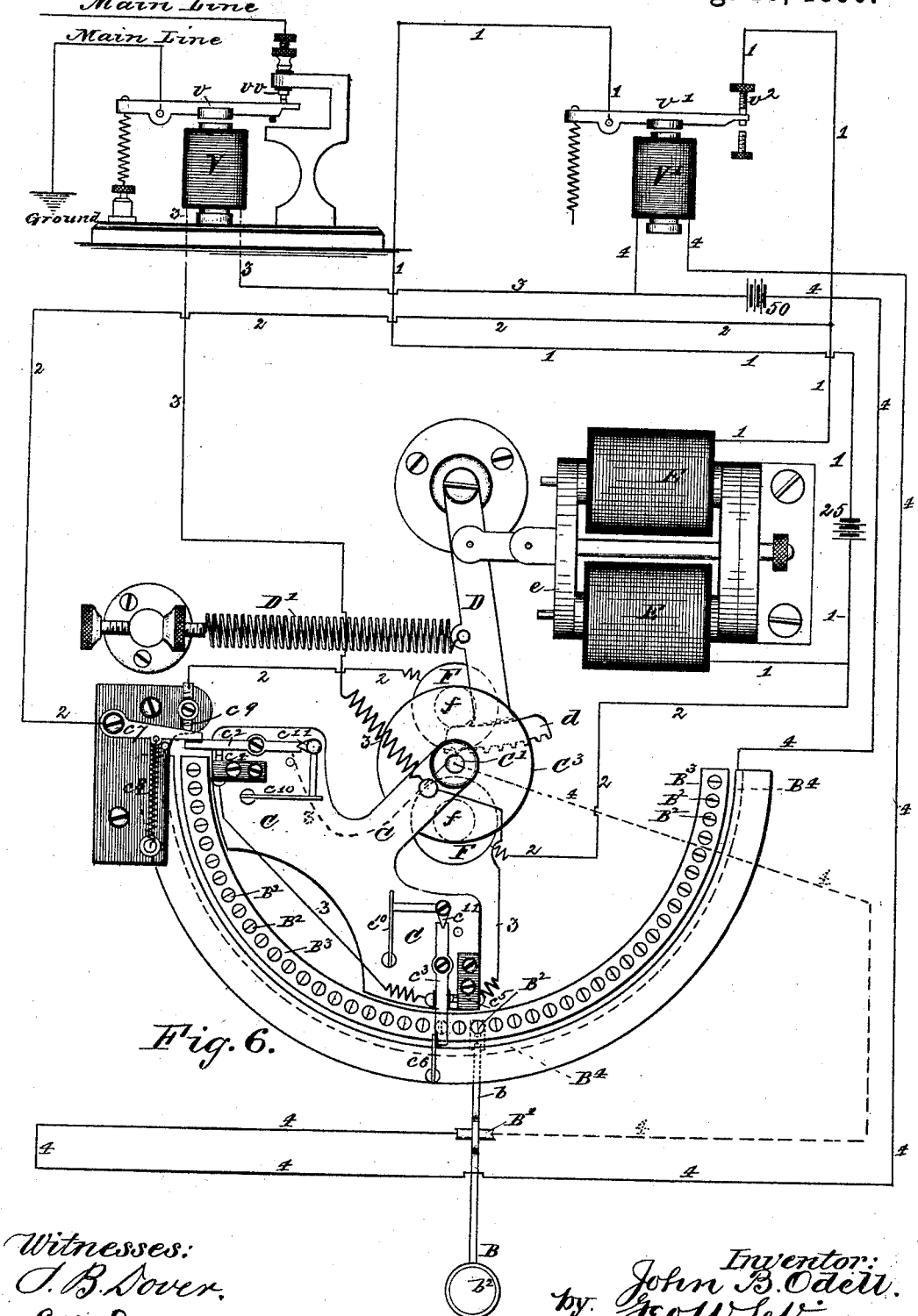
Figure 7:
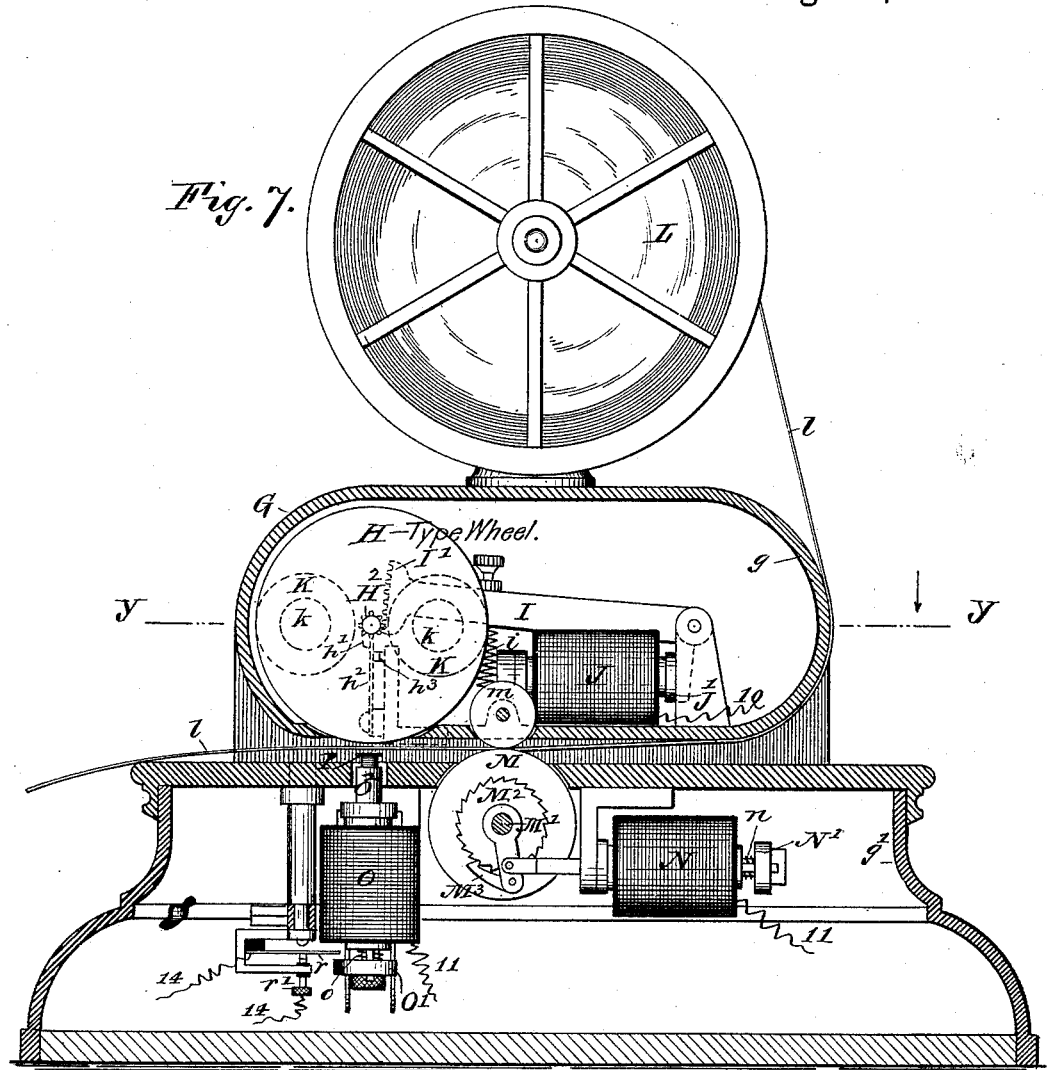
Figure 8:
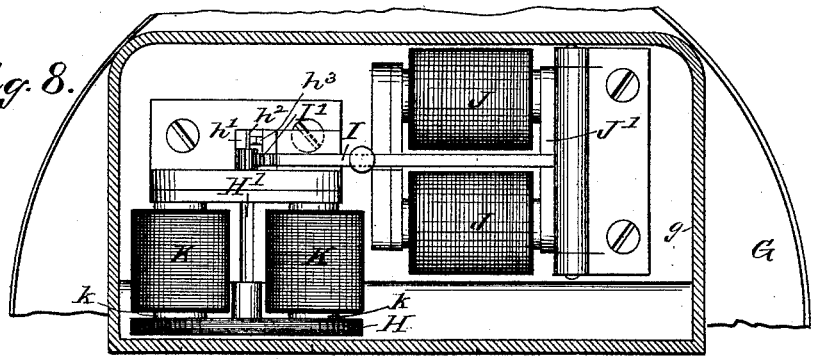
Figure 12:
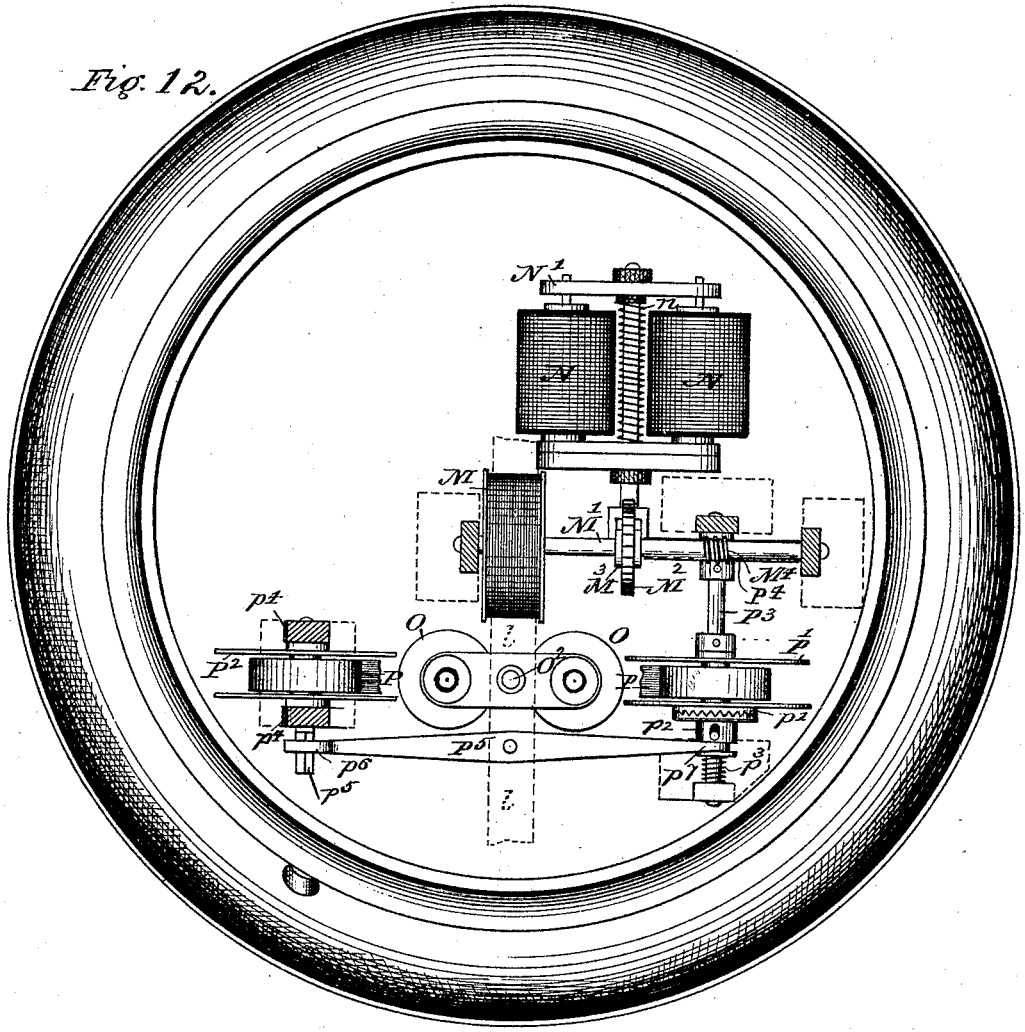
Figure 13:
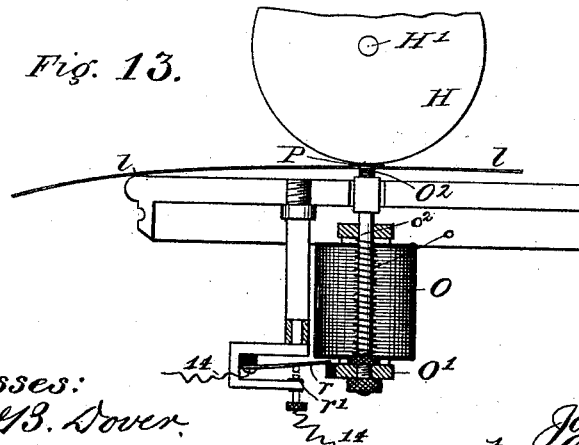
Figure 14:
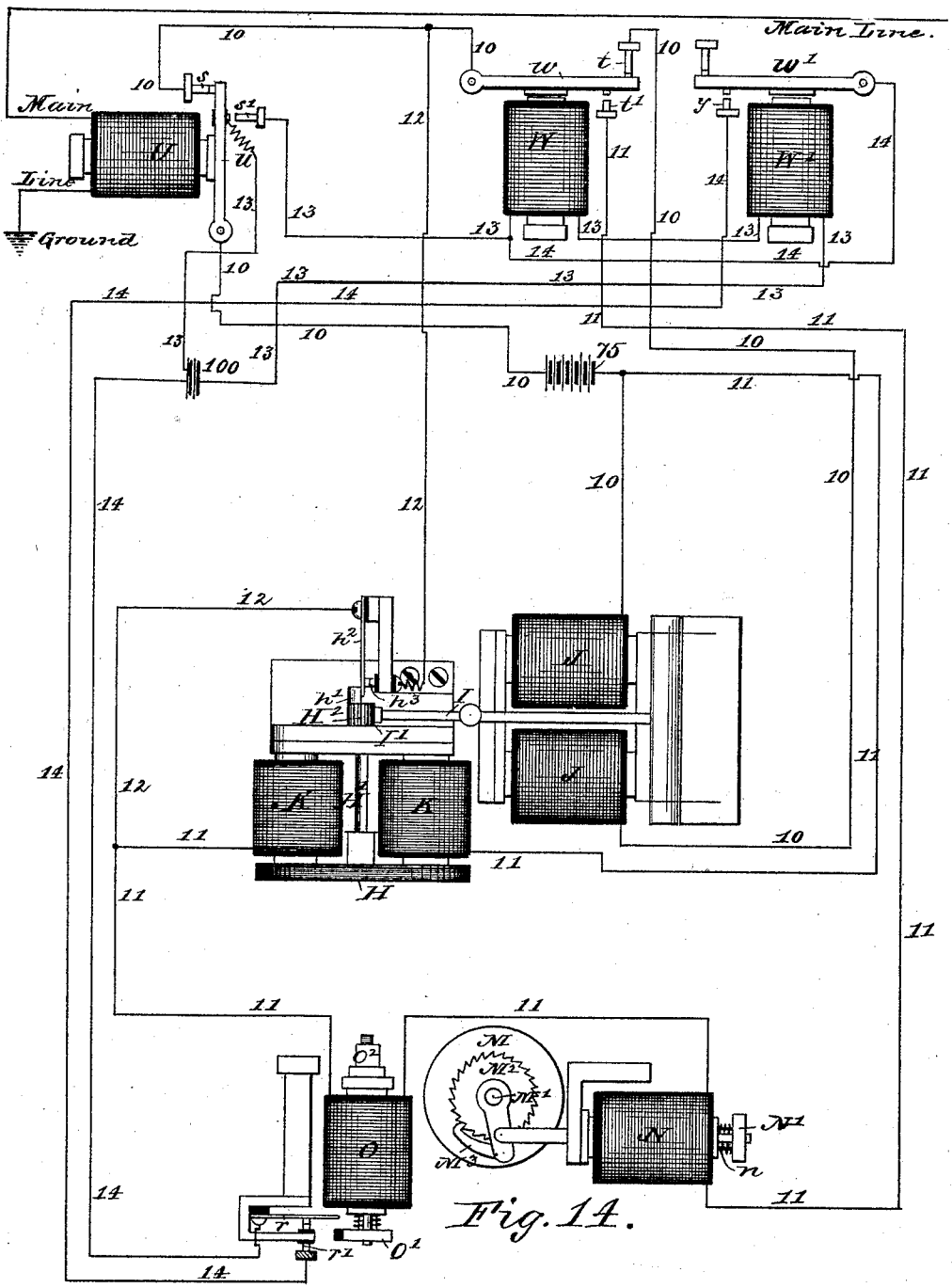

In the accompanying drawings, which illustrate a printing-telegraph system embodying in the most desirable form and manner of arrangement the various features of my invention, Figure 1 is a top plan view of the transmitter, in part broken away. Fig. 2 is an inverted plan view of the transmitter. Fig. 3 is a longitudinal section, taken through the transmitter, substantially on the line X X of said Fig. 1, with certain of the parts shown in elevation. Fig. 4 is a detail showing in elevation one of the key-levers of the transmitter, and the bar carried thereby, which intercepts the circuit-changer carried by the radius-arm. Fig. 5 is a broken detail showing in elevation the arrangement within their bearings of the bars which intercept the circuit-changer carried by the radius-arm and the key-levers connected therewith. Fig. 6 is a view, mainly diagrammatic, illustrative of the operative parts of the transmitter, its local circuits, and the relays which operate the same and the main line. Fig. 7 is a front elevation of the receiving-instruments, the frame, and certain of the operative parts, (elsewhere fully shown,) being broken away for the purpose of showing the general interior arrangement of the instrument. Fig. 8 is a detail in horizontal section of the upper portion of the receiving-instrument, taken on the line Y Y of Fig. 7, showing the arrangement of the printing-wheel and the devices which operate the same through its forward and return motions, also the devices employed for stopping the same when reaching its printing position. Fig. 9 is a side elevation of the receiving-instrument with the frame in part broken away, particularly intended to show the relative arrangement of the printing-wheel, the electro-magnets which arrest and hold the same in its forward movement and at its normal or starting position, the devices which close the circuit of said magnets when the printing-wheel has been retracted to its starting position, the printing-magnets, and the inking-ribbon carrying and feeding devices. Fig. 10 is a detail intended to further show the devices which effect closing of the circuit of the magnets which arrest and hold the printing-wheel when said wheel is retracted to its starting position. Fig. 11 is a detail mainly intended to show the manner in which the inking-ribbon roll is held in operative position. Fig. 12 is a plan detail of the receiving-instrument, taken on the line Z Z of Fig. 9, looking in the direction indicated by the adjacent vertically-drawn arrow, showing the location and operative arrangement of the magnets and the devices operated thereby which feed the strip upon which the printing is effected, the devices which feed the inking-ribbon, and the location of the printing-magnets with reference to the said other members. Fig. 13 is a broken side detail illustrative of the relative operative arrangement of the printing-wheel and the printing-magnets, further showing the manner in which the armature of said magnets opens and closes a circuit, hereinafter fully described. Fig. 14 is a diagrammatic view of the several members of the receiving-instrument, its local circuits, the relays which control the same, the main-line relay, and the main line.

Referring by letter to the several figures which illustrate the transmitting-instrument, (shown on Sheets 1, 2, 3, and 4,) A indicates the base of the instrument.

B refers to a series of finger-keys, each representing a letter, character, or figure, and B B a key employed for effecting spacing between words, &c. The said keys consist, desirably as shown, of levers $b$, carrying vertically-inclined stems $b'$, to which are fixed insulated buttons $b^2$, the said levers being pivotally sustained by a bearing-rod B′, working in bearings $b^3$, fixed to the base A and having operative connection by their inner ends, each with a perpendicularly-movable bar $B^2$, forming part of a series which work in suitable bearings formed in a semicircular double guide-bearing $B^3$, fixed to or forming a part of the base A.

$B^4$ is an insulated platinum contact, by preference in the form of an arc fixed to the under side of the base A, which forms an electrical connection through which a circuit, hereinafter described, is closed by means of either one of said levers $b$.

C is a horizontally-projecting radius-arm carried by a perpendicular spindle C′, the upper end of which works in a suitable bearing $c$, forming part of or fixed to the base A, its lower end being sustained by a bearing-spring $c'$. The said spindle carries a pinion $C^2$, which meshes with a corresponding rack $d$, forming part of a pivoted lever D, which carries an armature $e$ operatively connected with magnets E. To the said lever is attached one end of a coiled-wire spring D′, which is fixed by its other end to the base A, the office of which is to move through said rack and pinion the radius-arm C in one direction, the arm being operated similarly in the opposite direction by the magnets E. The said spindle C′ fixedly carries a circular plate-armature $C^3$, arranged in working contiguity or closely adjacent to the cores $f$ of electro-magnets F, which laterally straddle said spindle and which are fixedly held in position by a bracket F′, fixed to the base A.

The arm C carries desirably two pivoted electrically-connected circuit-changers $c^2$ $c^3$, through which when in normal position a circuit, hereinafter described, is closed, being adapted when the radius-arm is caused to move forward to engage with such one of the series of movable jaws $B^2$ as may be thrown by the operation of a finger-key within the path of travel of the member and to thereby open the said circuit. The said circuit-changers are held in normal position, as particularly shown in Figs. 1 and 6, each by means of a pivoted detent $c^{11}$, adapted to engage with the rear end thereof and to be in turn held in position by its free end by means of a spring $c^{10}$. The circuit-changer $c^3$ normally bears against a contact-point $c^5$, fixedly carried by the arm C, which has electrical connection with a main-line relay V, being forced into such contact when the arm C is at its normal position through the resistance of a flexible pressure bearing or spring $c^6$, insulated therefrom. The circuit-changer $c^2$ normally bears against a contact-point $c^4$, also fixedly carried by the arm C, through which wire connection is made with the circuit-changer $c^3$, a circuit-closing lever $c^7$, which works by its free end against an adjustable stop-contact $c^9$, being the means employed for forcing the said circuit-changer into contact with the point $c^4$ when the arm C is at its normal position. The circuit-closing lever $c^7$ is connected with a spring $c^8$, the tension of which is intended to draw the arm from the contact $c^9$ when the arm C starts in motion, and to thereby open a circuit, hereinafter more particularly described.

The key B B, provided for spacing purposes, is located in the construction shown at the extreme end of the key-board, its corresponding bar $B^2$ being adapted to intercept the movable radius-arm when it has described the full limits of its travel and to then change the electrical condition of the main line. This key, however, may be located at any desired point, as will be hereinafter set forth.

It may be here noted that two circuit-changers are employed on the radius-arm for the purpose of reducing or limiting the length of travel which would be required of said arm if a single circuit-changer should be employed, this arrangement being desirable for several reasons, one of which being reduction of the length of stroke of the armature $e$ of magnets E to retract through the lever D the radius-arm C, thus enabling the utilization of greater power by the said magnets when put in action.

Two relays V and V′ are employed in conjunction with the transmitter, as shown in Fig. 6, the armature $v$ of the relay V being connected with the main line, as shown, and serves by its movement to control the main-line circuit.

The circuits necessary to the operation of the instrument and the main-line circuit are as follows: The circuit which operates the relay V′ is formed from battery 50 by way of conductor 4 to platinum arc $B^4$, thence by lever $b$, lever-bearing B′, and conductor 4 through relay V′ to battery, and from lever-bearing B′ over base of the instrument (see broken lines 4) to radius-arm, over radius-arm (see broken line 3) through circuit-changer $c^2$ and point $c^4$ by conductor 3, circuit-changer $c^3$, and point $c^5$, conductor 3, through relay V, thence to battery. The circuit of the magnets F is from battery 25 by conductor 2, through said magnets, contact-point $c^9$, circuit-closing lever $c^7$, conductors 2 and 1, contact-point $v^2$, armature-lever $v'$, and conductor 1 to battery. The circuit of magnets E is from battery 25 by conductor 1, through armature-lever $v'$, point $v^2$, and conductor 1 through said magnets, thence by conductor 1 to battery.

Operation of the transmitter is as follows: Depression of a finger-key carries its lever $b$ to contact with the platinum arc $B^4$, closing the circuit of the relays V V' by way of conductors 4 and 3. As the lever $v$ moves responsively to the energization of its magnets V, the normally-closed main-line circuit is broken, the closing of the armature-lever V' effected thereby breaking through conductors 2 and 1 the circuit of the magnets F, also breaking through conductor 1 the circuit of magnets E. The radius-arm C being started in motion by the spring D', the circuit-closing lever $c^7$ is drawn by the spring $c^8$ from the point $c^9$, further opening the circuit, by way of conductor 2, of the magnets F, which is thus held open until the radius-arm is returned to its normal position. As the circuit-changer $c^2$ or $c^3$ is engaged in the travel of the radius-arm by the bar $B^2$ thrown up by the lever $b$ of the depressed key, contact between the circuit-changer and its corresponding contact $c^4$ or $c^5$ is broken, opening by way of conductor 3 the circuit of the relay V, which operates through the armature-lever $v'$ and point $v$ $v$ to close the main-line circuit. As the lever $b$ is allowed to move from engagement with platinum arc the circuit of the relay V' is opened through conductor 4 and battery 50, closing by way of armature-lever $v'$, conductor 1, and battery 25, the circuit of the magnets E, which, operating through the armature $e$ the pivoted lever D, causes the radius-arm C to be retracted to its original or starting position. As the radius-arm is carried back to its starting position the circuit-changer $c^2$ carried by said arm engages with the circuit-closing lever $c^7$ and carries the same against the fixed contact $c^9$, the circuit of the magnets F being thereby closed through conductors 2 and 1 and battery 24, causing said magnets through the circular armature $C^3$, carried by the spindle C', to arrest and rigorously hold the radius-arm against vibratory movement.

Referring by letter to the several figures illustrating the receiving-instrument shown on Sheets 5, 6, 7, and 8, G indicates the frame of the instrument, which sustains its several working parts, the said frame being desirably arranged in upper and lower portions $g$ $g'$, respectively. Within the upper portion $g$ is located a type-wheel H, provided on its perimeter with letters, characters, &c., and one or more blank spaces, as may be required, fixed to an axially-movable shaft H', which journals in bearings $h$ $h$ and which carries a pinion $H^2$.

I indicates a pivoted lever provided at its free end with a segmental rack I', which meshes with a pinion $H^2$, carried by the said shaft H', the said lever carrying at its other end adjacent to its pivoting-point an armature J'.

J are electro-magnets, which when energized attract the armature J', causing the lever I to be moved to its normal or starting position. $i$ is an actuating wire spring connected with said lever adapted to move the lever I in a direction, when the armature J' is freed from its magnets, which causes the type-wheel to be carried forward.

K are electro-magnets, the cores $k$ of which are in working proximity to the lateral face of the type-wheel H, the said magnets being provided and employed for arresting and holding the type-wheel through its forward movement at either of its printing positions and for arresting and holding the same when retracted to its normal position.

$h'$ is a circuit-closer carried by the shaft H' and movable therewith, the office of which is, when the type-wheel is retracted to its normal position, to carry an electrical spring-contact $h^2$ against the fixed contact-point $h^3$, and thereby close a circuit through which energization of the magnets K is effected for arresting and holding the type-wheel, as described.

L is a reel desirably located above the portion $g$ of the frame, which carries a continuous strip of paper or other suitable material $l$, which works through a suitable passway provided intermediate the upper and lower portions $g'$ of the frame between an idle roll $m$ and an intermittingly-actuated feed-roll M. The said roll M is fixed to a suitably-sustained shaft M', which carries a ratchet-wheel $M^2$, engaged and operated by a pawl $M^3$, connected with the armature N' of electro-magnets N, being operated in one direction through the energization of the said magnets and in the other direction through the resiliency of a coiled-wire spring $n$.

$O^2$ is a printing-bar, located upon a line drawn perpendicularly through the axis of the type-wheel H, being fixedly connected by means of a stem $o^2$ with the armature O' of electro-magnets O, which when energized carry said bar toward the type-surface of said wheel, the resiliency of a spring $o$, carried upon the stem $o^2$ of said bar, being the means employed for quickly retracting and normally holding the bar from the type-surface of the wheel.

P is an inking-ribbon carried by rolls P' $P^2$, the said ribbon working over idle rolls $p$ $p$ and intermediate the strip $l$ and the type-surface of the wheel H. The roll P' is carried idly by a shaft $P^3$, to which is fixed a worm-wheel $P^4$, which engages with a worm $M^4$, carried by the shaft M', the said worm imparting motion to said worm-wheel and therefore to said shaft $P^3$ simultaneous with the motion of the paper feed-roll M. The said roll is provided on one of its lateral faces with a ratcheted disk or ratcheted surface $p'$, which meshes with a similarly ratcheted collar, also carried by said shaft $P^3$, capable of movement longitudinally of said shaft and normally held in engagement with the ratchet $p'$, through the resistance of a coiled spring $p^3$, also carried by the said shaft, the said collar $p^2$ being arranged to rotate with said shaft and therefore to impart motion to the roll P'. The roll $P^2$ is removably sustained in position by means of a flat spring $p^4$, which, bearing upon the spindle $p^5$ thereof, holds the same within its bearings. A vibratory lever $P^5$, having bifurcated ends $p^6$ $p^7$, embraces, respectively, the shaft $p^5$ and the neck of the ratcheted collar $p^2$, being held outwardly with reference to the bearing $p^4$ of the shaft $p^5$ by means of the resistance of the spring $p^3$ upon the collar $p^2$. The ribbon being intermittingly wound upon the roll P' from the roll $P^2$ as the instrument is operated to rewind the same upon the roll $P^2$, a key (not shown) being applied to the end of the stand $p^5$ with sufficient force carries the end $p^6$ of the lever $P^5$ inwardly, moving the end $p^7$ outwardly, and therefore the ratcheted collar $p^2$ away from the ratcheted surface $p'$ of the roll P', thus allowing said roll to move freely upon its shaft as the shaft $p^5$ and the roll $P^2$ fixed thereto are rotated.

The circuits of the receiving-instrument, as shown in Fig. 14, are as follows: Three relays U, W, W' are desirably employed, the relay U being connected with the main line and the relays W and W' being connected, as will hereinafter more fully appear, with the relay V, and with the electro-mechanisms embraced in the instrument. The circuit of the relays W W', which is normally open, is from battery 100 by conductor 13, with main-line relay armature-lever $u$, thence by point $s'$ and conductor 13 through relays W W' back to battery. The circuit of the magnets J is by conductor 10 from battery 75 with armature-lever $u$ of the main-line relay, thence by point $s$ and conductor 10 with armature-lever $w$ of relay W, thence by point $t$ and conductor 10 to the opposite side of said magnets. A circuit embracing magnets K, N, and O is completed from battery 75 through conductors 11 to lower point $t'$ of relay W thence through the armature-lever $w$, conductor 10, and point $s$ on main-line relay, thence by lever $u$ and conductor 10 to battery. A circuit for operating the magnets K when the type-wheel has been retracted to its starting position is formed from battery 75, through conductor 10, main-line relay armature-lever $u$, point $s$, conductors 10 and 12 to point $h^3$, flexible contact $h^2$, and conductors 12 and 11 to said magnets, thence by conductor 11 to battery. A circuit provided for holding the relays W W' closed during the printing operation of the instrument, operated through the flexible contact $r$ by the armature of the magnets O, is formed from battery 100 by conductors 14, through the flexible contact $r$ and point $r'$, point $y$ of relay W', thence through armature-lever $w'$, conductor 14, relay W, thence by conductor 13 through relay W' back to battery.

The operation of the receiving-instrument is as follows: As the main-line circuit is opened by the relay V forming part of the transmitting apparatus, the armature-lever $u$ of the main-line relay U of the receiving-instrument drops away from the point $s$, opening, by way of conductors 10 and 12, the circuit of the magnets K, releasing the type-wheel, which is carried forward by the spring $i$, also opening the circuit of the magnets J simultaneous with the circuit of the magnets K. As the said armature-lever engages with the point $s'$ it closes the circuit of the local relays W W', further opening, through the point $t$ and conductor 10, the circuit of the magnets J. As the armature-lever $w'$ engages with contact-point $y$ it further closes the circuit of relays W W', through conductors 14 and contact-points $r'$ $r$, so that the circuit of said relays may be opened by the main-line relay as the main line is closed through the operation of the transmitting apparatus, as described, without de-energization of the magnets W W' being effected. As the relay armature-lever $w$ engages with the point $t'$ it closes connection by way of conductors 10 with the magnets K, O, and N preparatory to movement of the armature of the relay U, which upon the closing of the main-line circuit closes, through the point $s$, the circuit of said magnets, effecting the stopping of the type-wheel, the printing operations of magnets O, which carries the printing-bar toward the type-surface of the wheel, and operation of the magnets N, which retract the pawl $M^3$ preliminary to feeding forward the paper-roll M. As the armature of the magnets O moves forward in the printing operation it strikes the spring-contact $r$, opening the circuit of the local relays W W', breaking the circuit of the magnets K, O, and N, through the point $t'$, and further opening the circuit of the relays W W' at the point $y$, releasing the type-wheel from the magnets K, allowing the printing-bar to be withdrawn from the type-wheel, and permitting the pawl $M^3$ to feed the paper-roll M forward. As the armature-lever of the relay W engages with the point $t$ it closes the circuit of the magnets J, through conductor 10, which operation effects retraction of the type-wheel by said magnets to its normal position. As the type-wheel is carried back to its starting position the spring-contact $h^2$ is forced by the lug $h'$, carried by the shaft H', against the point $h^3$, thus closing the circuit of the magnets K, through wires 12 and 11, which arrest and hold the type-wheel in position. As the main line is successively opened and closed by the transmitting apparatus, the operation described of the receiving-instrument is successively repeated, the distance which the type-wheel shall travel at each operation and the time within which the several other functions of the instrument shall be performed co-operatively therewith being determined, through the relay U, by the period of time the main line circuit shall be held open by the transmitter, each such period of time being determined, as is herein set forth, by the distance traveled by the radius-arm of the transmitter intermediate its starting position and point of arrest by the intercepting-bar $B^2$.

Referring to the operation of the type-wheel to effect spacing, it is obvious that the space or blank provided in the type-wheel corresponds with the location within its series of the intercepting-bar B² of the transmitter, operated by the key B B, and that the period of time elasping between the opening and closing of the main-line circuit therethrough determines the length of movement of the type-wheel necessary to bring the space or blank thereof into alignment with the printing-bar in lieu of a letter or character.

Having thus sufficiently set forth my invention, I claim as new and desire to secure by Letters Patent—

1. In a printing-telegraph, the combination, in a transmitter, of a series of keys and a series of individual contact-points operatively connected with said keys, and a movable arm provided with several circuit-changers, each arranged to engage with certain of said contact-points, and suitable means for restoring said arm to its starting-point, and suitable means for connecting the transmitter with a receiver, substantially as described.

2. In a printing-telegraph, the combination, in a transmitter provided with a series of keys, and a series of individual contact-points operatively connected with said keys, of a movable radius-arm C, provided with circuit-changers $c^2$ and $c^3$, and with suitable contact-points $c^4$ $c^5$, carried by said radius-arm, and suitable means for operatively connecting said transmitter with a suitable receiver, substantially as described.

3. In a printing-telegraph, the combination, with the main line, of mechanism for opening and closing the circuit of said main line, comprising a series of keys, a local circuit provided with a relay for making and breaking the main-line circuit operatively connected with each of said keys, a movable arm for opening said local circuit, said movable arm being provided with several circuit-changers, means for retracting and advancing said arm and for holding the same at different points of its travel, and a series of individual contact-points operatively connected with corresponding keys of said series and arranged in the path of travel of said movable arm at different distances from its starting-point, substantially as described.

4. The combination, with the feed-roll M, its shaft M', the worm M⁴ on said shaft, and the devices for intermittingly operating said shaft, of the shaft P³, the worm-wheel P⁴, fixed to said shaft P³, the idle ribbon-roll P' on said shaft P³, provided with a lateral ratchet $p'$, the longitudinally-movable ratcheted collar $p^2$, means for operatively holding said ratchet and ratcheted collar in engagement, the removably-sustained ribbon-roll P², and its spindle $p^5$, and the vibratory lever P⁵, adapted to embrace the collar $p^2$ and spindle $p^5$, all arranged and operative substantially as shown and described.

JOHN B. ODELL.

Witnesses:
GEO. W. LEVIN,
L. F. MANN.